United States Patent [19]

Walsh et al.

[11] 4,437,122

[45] Mar. 13, 1984

[54] LOW RESOLUTION RASTER IMAGES

[75] Inventors: Brian F. Walsh, Etna; David E. Halpert, Enfield, both of N.H.

[73] Assignee: Xerox Corporation, Stamford, Conn.

[21] Appl. No.: 303,742

[22] Filed: Sep. 21, 1981

[51] Int. Cl.$^3$ .......................... H04N 1/38; H04N 5/14
[52] U.S. Cl. .................................... 358/166; 358/284; 340/146.3 MA; 340/730
[58] Field of Search ............... 358/166, 140, 260, 280, 358/284, 283; 340/146.3 AG, 146.5 MA, 723, 728, 730; 364/515

[56] References Cited

U.S. PATENT DOCUMENTS 4,032,977 6/1977 Liao ..................................... 358/280
4,150,400 4/1979 Wong .................................. 358/260

Primary Examiner—Michael A. Masinick
Attorney, Agent, or Firm—Ronald F. Chapuran

[57] ABSTRACT

The present invention enhances the resolution and quality of characters of a system receiving the information initially in the form of video display pixels and providing hard copy output. This is accomplished by storing at least three successive lines of video data in successive, parallel connected shift registers, applying the outputs of the shift registers to a decoder, and generating driving signals for the printer head. The decoder compares the pixels on the same line as well as in preceeding and succeeding lines that surround each specific input pixel to generate the printer head driving signals according to whether straight or curved line segments are to be formed. In effect, the printer increases the density of the information elements and simultaneously provides rounding off of character edges and smoothing of diagonals.

27 Claims, 8 Drawing Figures

UNENHANCED CHARACTERS

3×3 ENHANCED CHARACTERS

EXAMPLES SHOWING ENHANCED PIXELS ADDED AND DELETED

FIG. 6
KEY
BLACK
WHITE
BLACK/WHITE
TABLE OF NEIGHBOR FIELD MATCHES
3 x 3 PIXEL ENHANCEMENT
| UNENHANCED PIXEL NEIGHBOR FIELD | RESULTING CENTRAL SUB PIXELS AFTER ENHANCEMENT | UNENHANCED PIXEL NEIGHBOR FIELD | RESULTING CENTRAL SUB PIXELS AFTER ENHANCEMENT |
|---|---|---|---|
|  #1 |  | 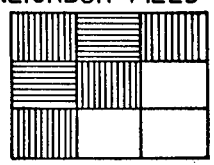 #2 |  |
| 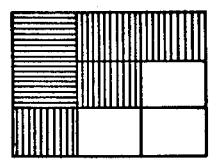 #3 |  | 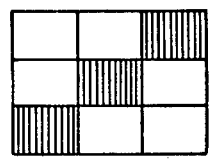 #4 |  |
| 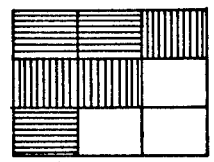 #5 |  | 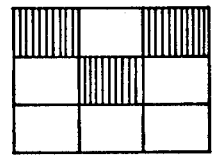 #6 |  |
| 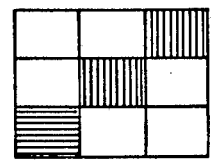 #7 |  | 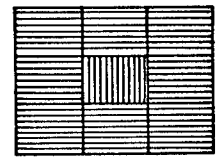 #8 |  |
| 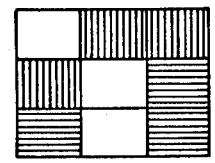 #9 |  | 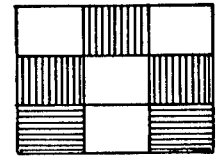 #10 |  |
| 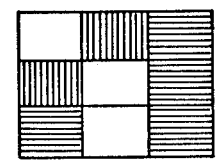 #11 |  |  #12 | |

FIG. 7

KEY
▦ BLACK
☐ WHITE
☰ BLACK/WHITE

EXAMPLES OF 360° ROTATION OF NEIGHBOR FIELD
3 × 3 PIXEL ENHANCEMENT

UNENHANCED PIXEL NEIGHBOR FIELD  RESULTING CENTRAL SUB PIXELS AFTER ENHANCEMENT  UNENHANCED PIXEL NEIGHBOR FIELD  RESULTING CENTRAL SUB PIXELS AFTER ENHANCEMENT

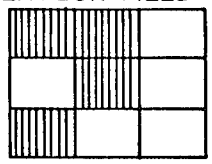  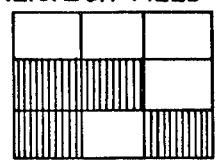 

\#13 \#14

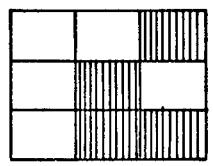  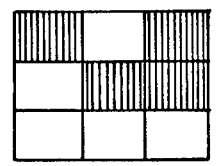 

KEY
▦ BLACK
☐ WHITE
☰ BLACK/WHITE

EXAMPLES OF MIRROR IMAGES OF NEIGHBOR FIELD
3 × 3 PIXEL ENHANCEMENT

UNENHANCED PIXEL NEIGHBOR FIELD  RESULTING CENTRAL SUB PIXELS AFTER ENHANCEMENT  UNENHANCED PIXEL NEIGHBOR FIELD  RESULTING CENTRAL SUB PIXELS AFTER ENHANCEMENT

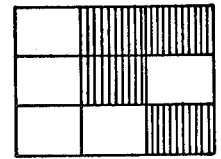  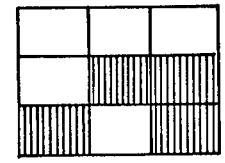 

\#17 \#18

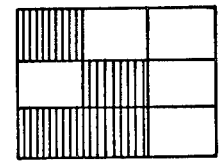  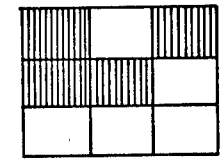 

\#19 \#20

LOW RESOLUTION RASTER IMAGES

IMPROVEMENT OF LOW RESOLUTION RASTER IMAGES

This invention relates to an improvement in low resolution raster images, and in particular, to the conversion of low resolution images to images of higher rsolution.

Cathode ray tube (CRT) resolutions of ≦100 lines per inch are generally practiced in the art. This degree of resolution is generally found acceptable on soft copy or screen displays. However, a much higher resolution is demanded for images on hard copy. Unfortunately, improvements in resolution and visual quality are often complex and expensive. It would be desirable, therefore, to provide a simple, relatively economical means for converting relatively low resolution images as found acceptable on soft copy to relatively high resolution images for hard copy.

The prior art is replete with image printing systems. For example, Robinson, U.S. Pat. No. 3,991,868 shows that double and triple size characters can be printed by storing segments of the double and triple size characters in suitable ROM's. For double sized characters, for example, the upper portions of the characters are printed along a first normal sized character line and the lower half printed along the next character line. Thus, the size of a printed character is effectively expanded by storing a character line in a shift register and driving one of three character decoders in accordance with the size of the character to be printed. In Pietermaat et al, U.S. Pat. No. Re. 29,998 a plurality of shift registers stores sample video signals to provide sufficient time to drive dot matrix print heads. Kondo, U.S. Pat. No. 3,871,003 shows a variety of shift registers to temporarily store a video output of a computer system. Signals for selecting recording positions are combined with input pictorial information to produce recording signals representing the optical density of recording as well as recording positions. The secondary windings of a transformer assembly correspond to the recording positions to pulse recording electrodes.

These teachings, however, do not show how to enhance the image. That is they do not show how to improve the quality of the character to be printed, but are more directed to improvements such as increasing the print speed of the printer or simply increasing the size of the character. It would be desirable, therefore, to provide a system for improving the visual quality of printed characters by temporarily storing the outputs of multiple successive lines, comparing the pixels in each of these lines with those in adjacent positions, and generating a print signal in accordance with the results of the comparison.

Accordingly, it is an object of the present invention to provide a new and improved system for converting low resolution image signals into relatively high resolution image signals. It is a further object to provide an image enhancement system that is economical and easy to implement to provide relatively high resolution hard copy. Further advantages of the present invention will become apparent as the following description proceeds, and the features characterizing the invention will be pointed out with particularity in the claims annexed to and forming a part of this specification.

Briefly, the present invention is concerned with increasing the resolution and quality of characters of a system receiving the information initially in the form of video display pixels and providing hard copy output. This is accomplished by storing at least three successive lines of video data in successive, parallel connected shift registers, applying the outputs of the shift registers to a decoder, and generating driving signals for the printer head. The decoder compares the pixels on the same line as well as in preceeding and succeeding lines that surround each specific input pixel to generate the printer head driving signals according to whether straight or curved line segments are to be formed. In effect, the printer increases the density of the information elements and simultaneously provides rounding off of character edges.

FIG. 6 illustrates the conversion table or scheme for enhancing a particular pixel;

FIG. 7 illustrates the 90° rotation of a neighboring field; and

FIG. 8 illustrates mirror images of a typical neighboring field.

Figure 1:
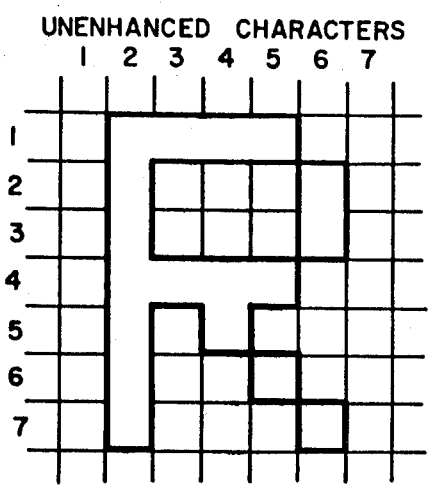
FIG. 1 illustrates the character R as it typically appears in a video display.

Referring now to the figures, with reference to FIG. 1, the letter "R" is shown represented in a rectilinear form as it commonly appears on a video display and provided at the output of a computer or display terminal. The character is formed from a number of adjacent sectors corresponding to pixels on a video display. A typical sector in FIG. 1 is designated as 45 (row 4, column 5). Each sector is either "solid" or not, in accordance with whether the corresponding pixel element in "on" or "off".

It should be noted that the image to be enhanced has already been converted into an appropriate digital format by other means in an information processing system. This digital format or video signal represents a line-by-line scan of an image field. When digitized, each information bit in the video signal represents the presence or absence of a pixel (picture element) at each point in the field, and thus represents the image to be reproduced. The image is effectively divided into a number of sectors, preferably one sector for each pixel.

Figure 2:
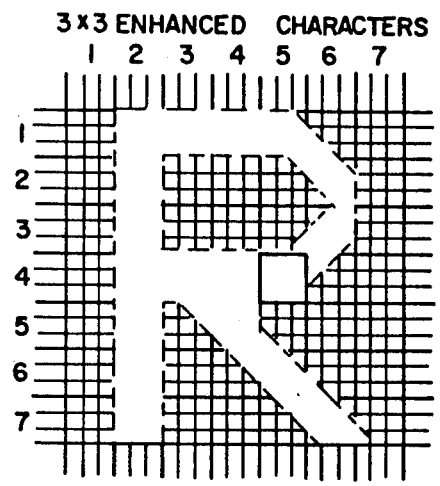
FIG. 2 represents the character R enhanced in accordance with the present invention representing a 3×3 expansion of the character in FIG. 1.
Figure 3:
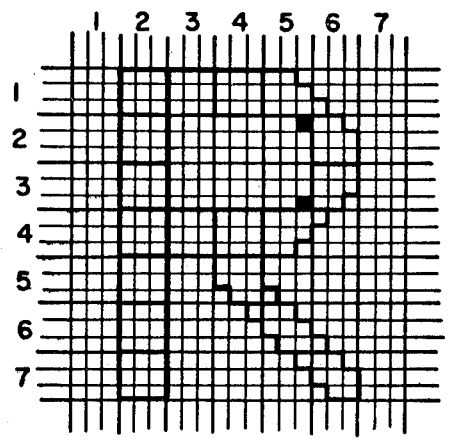
FIG. 3 shows the character R illustrating the addition and deletion of pixels to produce the enhanced character of FIG. 2.

For each sector, in accordance with the present invention, the status of each "nearest neighbor" is examined for the presence or absence of a pixel. The eight surrounding pixels or nearest neighbors for a particular pixel is called a neighboring field. The result of this examination of the neighboring field is to produce an identifier which uniquely represents an enhanced status of each pixel or sector as shown in FIGS. 2 and 3. This identifier is then applied to a decoder which provides enhanced sector data as an output to a printing head.

In effect, each pixel or sector is converted to a 3×3 enhancement. The on-off status of each element of the 3×3 enhancement of a particular pixel is determined by the initial examination of the neighboring field of that particular pixel. The enhanced sector data, for example, typically comprises a sector of increased point density, with certain of the points deleted or added, as appropriate, to form a rounded, diagonal or other desired curvilinear shape. The output data is then printed by conventional printing means in a conventional manner.

The image enhancer or conversion procedure according to the present invention examines each sector of the neighboring field of a particular sector or pixel and forms the unique identifier for enhancing that particular pixel. Thus, for example, for the sector 45, in FIG. 1, the image enhancer examines the sectors 35 and 55 immediately above and below it, the sectors 44 and 46 immediately to the left and to the right of it and the sectors 34,36, 54,56 diagonally adjacent to it. The identifier formed as a result of this examination then determines whether the sector 45 as finally reproduced will correspond precisely with the sector as originally presented or will, instead, be modified to enhance the sector as originally presented.

In FIG. 2, each sector of FIG. 1 has been subdivided into a 3×3 matrix of subsectors. Thus, the character in FIG. 2 has three times the pixel density or resolution of the character R in FIG. 1. Also it should be understood that the character R is illustrated as white whereas as actually printed, the character will be black. Each of these subsectors can be modified to enhance the original sector. Thus, in FIGS. 2 and 3, the lower right subsector of sector 45 is off or white while the remaining eight subsectors remain on or black. The effect is to smooth a portion of the character R. Other sectors are similarly enhanced. For example, sector 35 immediately above the sector 45, in the enhanced form, will have a portion "filled in", despite the fact that the original was blank. This further enhances the appearance of the resultant image. Thus, as shown in FIG. 3, the image enhancer of the present invention can both fill in (sector 35) and remove (sector 45) portions of sectors in the final image in order to improve the quality of the original image.

Figure 5:
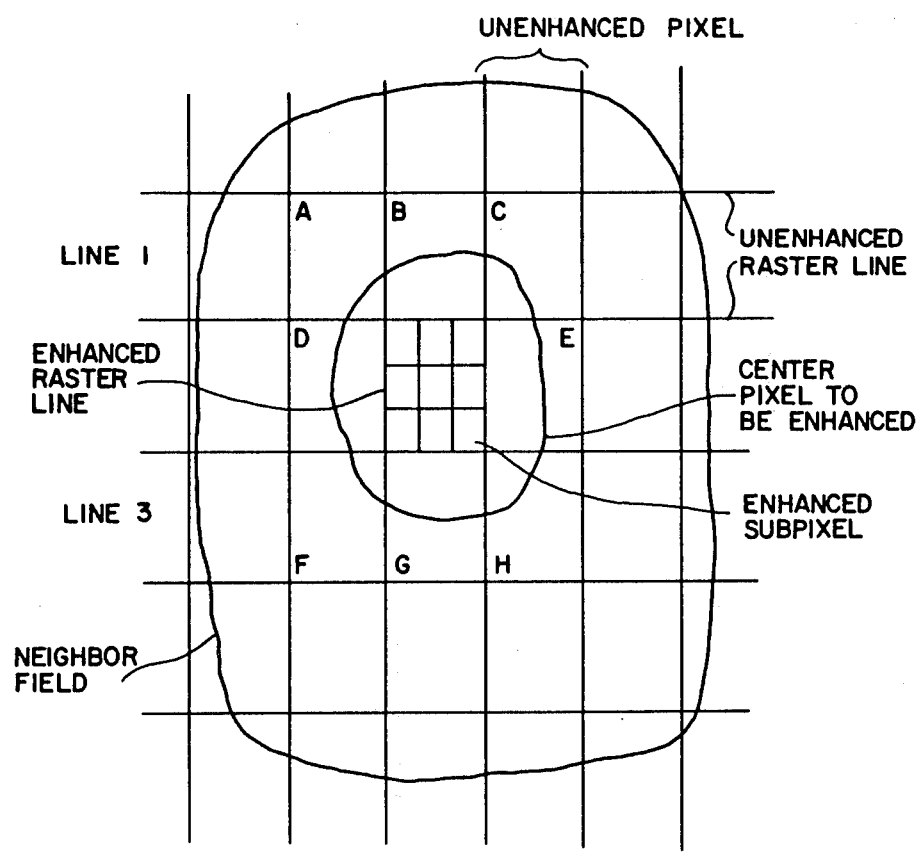
FIG. 5 illustrates the eight pixels forming a neighbor field surrounding a typical pixel in a video display.

The enhancement procedure operates in the following manner. The system scans across each line of raster data and for each pixel determines a 3×3 subpixel enhancement of that pixel. It does this by examining the 8 neighboring pixels A, B, C, D, E, F, G and H, in the original unenhanced image as shown in FIG. 5. To do this, three successive lines (line 1, line 3 and the intermediate line containing the pixel to be enhanced) of raster data must be available simultaneously, with the pixel information (black or white) synchronized in time as with the original image. The system thus looks at a field of 9 pixels, the central pixel being the sector to be enhanced. The 8 surrounding pixels are in the exact same physical orientation as they would be seen in the unenhanced image.

As each specific enhancement is produced, the neighbor field increments along each raster line. That is, the sector to the right of the central pixel next becomes the central pixel and the previous central pixel becomes a neighbor field sector. When a complete neighbor field is lacking such as in the first raster line, or at the edge pixel in a line, the missing sectors or pixels are considered white. When the end of a line is reached, the neighbor field moves down on line.

Once each field of 8 subpixels for each pixel is determined, the enhancement of the central pixel is done either by directly addressing a 9 bit table location and reading out 9 bits of data which corresponds to the 3X enhancement in each dimension or by performing a table search. The table search can be performed by progressively examining an ordered table of matches to find an equivalent images and its related enhancement. A table of patterns is shown in FIG. 6.

In the table presented, each entry has each of the 9 pixels in the unenhanced neighbor field either on (vertical cross-hatch representing black) or off (white) or does not matter (horizontal cross hatch). To find a match, the table field must have exactly the same kind of pixels as the field being enhanced. In some cases, certain pixels can be either on or off and still constitute a match, but the pixels on and off must be in exactly the same position in the table field as the initial image field or its rotated or mirrored equivalents illustrated in FIGS. 8 and 9 by patterns 13 through 20. Once a match is found, the appropriate symmetrical enhancement is used for the central pixel.

It should be understood that patterns 1 through 20 are merely illustrative to produce a particular enhanced image. Other enhancement techniques are easily obtainable from the teaching of this invention. Other enhancement techniques could provide for example a different image font, a different degree of image manipulation, or a different degree of image resolution enhancement.

If the output of the enhancement is a raster scan-like device (such as a printer or another CRT), the procedure is generally as follows. Each raster line of the input image is scanned through three times before the row is incremented. Each successive scan of the same line produces a new raster line of subpixels for the enhanced pixel. For example, the first scan of a line of the image produces the three top subpixels of the enhanced image. The second scan of the same line produces the middle three subpixles of the enhanced image and the third scan produces the bottom three subpixels. In other words, each pixel of the original image line is converted into a 3×3 matrix of subpixels. To do this, it is necessary to scan the line containing the center pixels three times to successively produce the top, middle and bottom subpixels. Thus a 3X enhanced is produced. In effect, each unenhanced 9 bit pixel set is mapped into a 9 bit enhancement of the central pixel of the unenhanced set.

For example, FIG. 6 list twelve basic unenhanced pixel neighbor field patterns and the associated central pixel after enhancement. Each of the pixels in a pattern is represented as either black, by vertical cross-hatching, white or by a horizontal cross-hatched pattern. The horizontal cross-hatched pattern means that the pixel can either be black or white and does not affect the resulting enhanced center pixel. Pattern 1 in FIG. 6 shows four black pixels, three white pixels and two horizontal cross-hatched pixels. The resulting enhanced center pixel shows an almost completely black center pixel with one white subpixel in the lower righthand corner.

Patterns 2, 3 and 5 show variations having four dark sectors, three white sectors and two horizontal cross-hatched sectors, with the resultant center pixel having the same pattern, black with only a white subpixel in the lower righthand corner. The pattern as shown in 4, results in an enhanced pixel having a white subpixel in both the upper left and lower righthand corners, and the pattern in 6 results in an enhanced pixel having white subpixels in the lower left and lower righthand corners. Pattern 7 is similar to pattern 4 except the lower lefthand neighbor sector can be either white or black. In a similar manner, the patterns 9, 10 and 11 will result in the enhanced pixel as shown corresponding to those three patterns.

Pattern 8 has a dark center pixel and the remaining neighbor sectors represented as being either on or off. The resulting enhanced pixel will be a completely black center pixel. However, it should be understood that this is a default case and the resulting pixel will only occur in the case of pattern 18 if no other match is found. That is, if the pattern 8 is not identical to patterns 1-7, or as will be seen, a rotation or mirror image of these patterns, then the resultant pixel will be as shown for pattern 8.

Pattern 12 has a white center pixel is also a default case. That is, if the pattern does not match any of the patterns 1-7, or 9, 10 or 11, or rotations or mirror images thereof, and the pattern has a white center pixel, then the resultant pixel will be completely white.

With reference to FIG. 7, there is shown patterns 13, 14, 15 and 16. These patterns are the same as pattern 1 except that the horizontal crosshatched subpixels shown in pattern 1 are white in patterns 13-16. These patterns illustrate the 90° rotation of pattern 1. As shown in FIG. 7, the resulting enhanced pixel shows a white subpixel successively in the lower righthand corner, the upper righthand corner, the upper lefhand corner, and the lower lefthand corner. In operation, each table entry is rotated 90° to see if any of the rotated patterns correspond to the unenhanced neighbor field being examined. These rotated patterns wll result in the corresponding enhanced central pixel if a match is found.

Additional patterns in FIG. 8, show mirror images of a neighbor field. In particular, patterns 17, 18, 19 and 20 illustrate mirror images of patterns 13, 14, 15 and 16. The resultant enhanced pixels are the mirror image of the resultant subpixels of patterns 13, 14, 15 and 16. In particular, the resultant enhanced pixel of pattern 17 is a white subpixel in the lower lefthand corner, the resultant pixel for pattern 18 is a white subpixel in the upper lefthand corner, for pattern 19, a white subpixel in the upper righthand corner, and for pattern 20, a white subpixel in the lower righthand corner. The patterns 17, 18, 19 and 20 are also searched for a match with the original unenhanced pixel and neighbor field.

Figure 4:
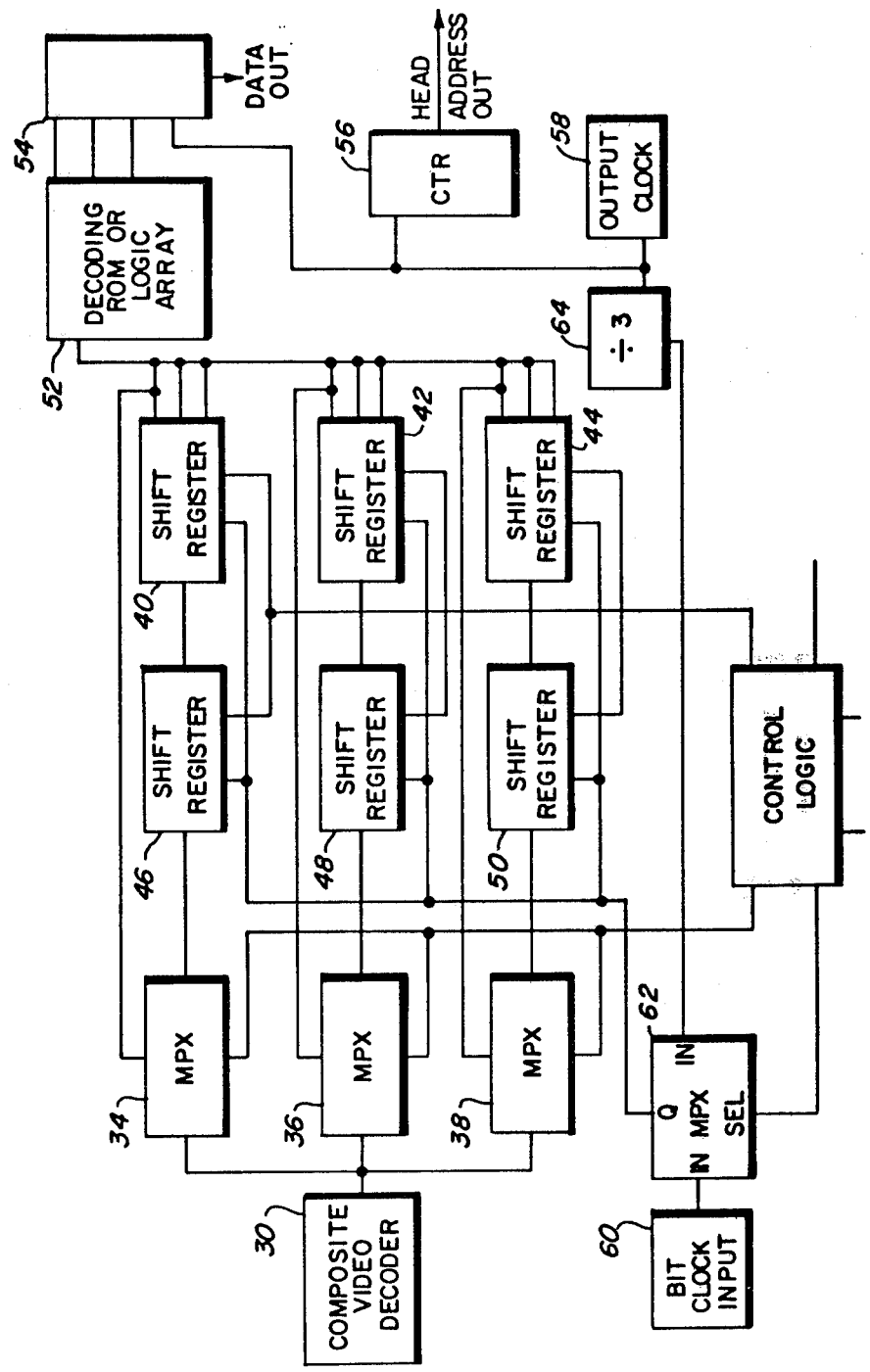
FIG. 4 is a block diagram of the conversion apparatus in accordance with the present invention.

Apparatus for performing the image enhancement in accordance with the present invention is shown in FIG. 4. A composite video decoder 30 strips the horizontal and vertical synchronizing signals from applied video data. The decoder 30 transmits these signals to line selectors 34, 36 and 38. The two-to-one line selectors 34, 36, 38 receive second inputs from three-bit shift registers 40, 42 and 44. The outputs of line selectors 34, 36, 38 are applied to shift registers 46, 48 and 50, respectively.

The registers 46, 48, 50 are, for example, 477-bit shift registers to accommodate one video scan line each. Register 48 receives the scan line containing the center pixel to be enhanced. Register 46 receives the image line above the center pixel and register 50 receives the scan line below the center pixel. One by three shift registers 40, 42, 44 receive the outputs of registers 46, 48, 50 three bits at a time, and, in turn, apply their outputs (3 bits) to a decoder 52. The decoder 52 receives the 3×3 bit matrix array corresponding the unenhanced center pixel and 8 neighboring sectors. Shift register 40 provides the top 3 neighboring sectors, register 42 provides the center pixel and two neighbors from the image line to be enhanced, and register 44 provides the bottom three neighboring sectors. The output of decoder 52 comprises three successive three-bit strings of data applied to a reproducing head through a three-bit shift register 54. A counter 56 provides the appropriate incrementing drives for the head location, while clocks 58 and 60, data selector 62, and counter 64 provide appropriate timing signals for advancing the data bits through the shift registers 40, 42, 44, 46, 48 and 50.

The decoder or logic array 52 maps each unenhanced 9 bit pixel set provided by registers 40, 42 and 44 into the 9 pixel enhancement of the central pixel. In particular, an algorithm, as illustrated in Appendix I, compares the unenhanced 9 bit pixel set with the table of patterns as illustrated in FIGS. 6, 7, and 8 to provide an identifier which uniquely describes the status of each neighboring sector of the center pixel. Depending upon this identified decoder 52 produces the corresponding 9 bit enhancement of the central pixel.

As each line of video data is applied to the decoder 30, it is routed through one of the data selectors 34, 36, 38 to one of the corresponding shift registers 46, 48, 50. At any given time, therefore, the shift registers 46, 48, 50 will contain successive lines of video data. Thus, the outputs of the three bit registers 40, 42, 44 at a given time comprises a 3×3 matrix so that information concerning the central pixel in a given middle line is provided. In other words, successive outputs from the registers 40, 42, 44 provide the neighbors field or 8 surrounding bits of the center pixel provided by register 42. This information forms the "identifier" or "address" which is compared to the table of patterns and applied to decoder 52 to generate the required sectors for the enhanced image. In the present case, for each sector or pixel in the original image, a 3×3 matrix of sectors are formed in the enhanced image.

Often for system timing convenience, it may be desirable to add other shift registers of equivalent function to registers 46, 48 and 50 to buffer succeeding raster lines and further decouple the printing means timing from the input raster timing.

The procedure has been implemented by a minicomputer and plotter. The procedure could also be implemented in simple hard wired and/or LSI electornics. Appendix I is a sample program listing written in FORTRAN on a VAX system.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

---

APPENDIX I

```
C+
C       CSMOOT-SMOOTH A CHARACTER-MAIN ROUTINE
C-
C
C
        PROGRAM CSMOOT
```

APPENDIX I

```
C
C       INCLUDE 'CSMDEF.INC'
C
C
        TYPE*, 'ENTER HIT DETAIL FILE NAME [CR=NONE]'
        ACCEPT 1,CTEMP
1       FORMAT (A32)
        IF(CTEMP.NE.' ') THEN                            !IF WANT TEXT OUT
        DTLUNT=DTLUVL
        OPEN(UNIT=DTLUNT,STATUS='NEW',NAME=CTEMP,ERR=900)
        END IF                                           !END IF
C
C
        TYPE*,'ENTER TEXT PLOT FILE NAME'
        ACCEPT 2,CTEMP
2       FORMAT(A32)
        IF (CTEMP.NE.' ') THEN                           !IF WANT TEXT OUT
        TXTUNT=DXTUVL
        OPEN(UNIT=TXTUNT,STATUS='NEW',NAME=CTEMP,ERR=900
        END IF                                           !END IF
C
C
        PLTFLG=.FALSE.                                   !SET NO PLOTS
        TYPE*,'WANT GOULD PLOTS'
        ACCEPT 4,CTEMP
4       FORMAT(A1)
        IF (CTEMP.EQ.'Y') PLTFLG=.TRUE.                  !IF YES GET THEM
C
        TYPE*,'ENTER CHARACTER DATA FILE NAME'
        ACCEPT 3,CTEMP
3       FORMAT (A32)
        BCDUNT=BCDUVL
        OPEN (UNIT=BCDUNT,STATUS='OLD',NAME=CTEMP,ERR=900)
C
C
        CALL CSMLXT(TBA,TPA,TLTCNT,TLTUNT)               !LOAD TRANSLATION ARRAYS

IF (PLTFLG) CALL PLOTS(16.,21.)                  !SET PLOTTING
        IF (PLTFLG) CALL FACTOR (2.)
C
C
10      CONTINUE                                         !LOOP
        TYPE*,'NEXT CHARACTER [YES, NO,EXIT]'
        ACCEPT 1,CTEMP
        IF (CTEMP.EQ.'E') GOTO 20                        !EXITIF EXIT
        CALL CSMGTC (BA10,SUC,BCDUNT)                    !GET A CHARACTER
        IF (SUC.EQ..FALSE.) GOTO 20                      !EXITIF NO MORE
        IF (CTEMP.EQ.'Y') THEN                           !IF WANT TO DO IT
        DO 15 Y10=1,10                                   !LOOP ON BA10
        DO 15 X10=1,10
        DO 15 Y3=1,3
        DO 15 X3=1,3
        PA30(X10-1)*3+X3,(Y10-1)*3+Y3)=BA10(X10,Y10)
15      CONTINUE                                         !END LOOP BA10=PA30
        IF (PLTFLG) CALL GNRTE (PA30)                    !PLOT OUT BLOCKY
        CALL CSMPRT (PA30, TXTUNT)                       !PRINT IT
        CALL CSMWRK (BA10,PA30,TBA,TPA,TLTCNT,DTLUNT)
                                                         !SMOOTH IT
        CALL CSMPRT (PA30, TXTUNT)                       !PRINT IT
        IF (PLTFLG) CALL GNRTE (PA30)                    !PLOT OUT SMOOTHED
        END IF                                           !END IF
        GOTO 10
20      CONTINUE                                         !END LOOP
C
C
        IF (PLTFLG) CALL PLOT(0.,0.,999)                 !TERMINATE PLOT
C
        STOP
C
C
900     STOP 'ERROR OPENING FILE'
        END
C+
C       CSMSMT-GENERATE A 3 BY 3 SMOOTHED PIXEL ARRAY FROM A
        3 BY 3 BLOCK ARRAY
C       THE TRANSLATION ARRAY IS ASSUMED TO HOLD ALL NECESSARY
        ROTATIONS
C
C       INPUTS-BA3-THE 3 BY 3 BLOCK ARRAY
C              -TBA,TPA,TLTCNT-THE TRANSITION ARRAYS AND COUNT
```

APPENDIX I

```
C              -DTLUNT-DETAILS
C
C         OUTPUTS-PA3-THE 3 BY 3 PIXEL ARRAY
C—
C
C
          SUBROUTINE CSMSMT(BA3,PA3,TBA,TPA,TLTCNT,DTLUNT)
C
C
          INCLUDE 'CSMDEF.INC'
C
C
          INTEGER*4 TRIDX                                          !INDEX INTO TRANSLATION
                                                                   ! TABLES
C
C
D         WRITE(DRGUNT,*) 'BA3 AT ENTRY TO CSMSMT'
D         WRITE(DBGUNT,1)BA3
D1        FORMAT(' ',3I3/)
C
C
          DO 30, TRIDX=1,TLTCNT                                    !LOOP ON ALL TRANSLATIONS
          SUC=.TRUE.                                               !SET GOOD
          DO 10, Y3=1,3                                            !LOOP ON THE INPUT DATA
          DO 10, X3=1,3
          IF(TBA(X3,(((TRIDX-1)*3)+Y3)).NE.-1. AND.
     .    TBA(X3,(((TRIDX-1)*3)+Y3)).NE.
     .    BA3(X3,Y3)) SUC=.FALSE.                                  !SET BAD IF NO MATCH
                                                                   !(-1)=NO-CARE
          IF(SUC.EQ..FALSE.)GOTO 20                                !EXITIF NO MATCH
10        CONTINUE                                                 !END DO
20        CONTINUE                                                 !END LOOP
          IF (SUC.EQ..TRUE.)GOTO 40                                !EXITIF FOUND A MATCH
30        CONTINUE                                                 !END DO
40        CONTINUE                                                 !END LOOP
C
C
          IF(SUC.NE..TRUE.)STOP 'NO MATCH FOUND IN CSMSMT'
C
C
          IF(DTLUNT.NE.0) THEN                                     !IF WANT DETAILS
          WRITE(DTLUNT,*)'FOUND XLATION ENTRY #', TRIDX, TRIDX/4.
          END IF                                                   !END IF
          DO 50, Y3=1,3                                            !LOOP ON PIXEL ARRAY
          DO 50, X3=1,3
          PA3(X3,Y3)=TPA(X3,(((TRIDX-1)*3)+Y3))                    !MOVE SMOOTHED STUFF
50        CONTINUE                                                 !END LOOP ON PIXEL ARRAY
C
C
D         WRITE(DBGUNT,*)'PA3 AT EXIT FROM CSMSMT'
D         WRITE(DBGUNT,31)PA3
D31       FORMAT(' ',3I3/)
          RETURN
          END
C+
C         CSMWRK-GIVEN A 10 BY 10 BLOCK CHARACTER GENERATE A 30
          BY 30 PIXEL
C         CHARACTER
C
C
C         INPUTS-BA10-THE BLOCK CHARACTER
C               -DTLUNT-THE DETAIL UNIT(0=NONE)
C
C         OUTPUTS-PA30-THE PIXEL ARRAY
C
C—
C
C
          SUBROUTINE CSMWRK(BA10,PA30,TBA,TPA,TLTCNT,DTLUNT)
C
C
          INCLUDE 'CSRDEF.INC'
C
C
          BYTE BWA(12,12)                                          !DEFINE BLOCK WORK ARRAY
C
C
          DO 10 Y10=1,10                                           !LOOP ON CHARACTER BLOCK
          DO 10 X10=1,10
          BWA(X10+1,Y10+1)=BA10(X10,Y10)                           !PUT WORK ARRAY WITH 1
                                                                   !SPACE ON EACH EDGE
10        CONTINUE                                                 !END LOOP
```

-continued

APPENDIX I

```
             DO 40 Y10=1,10                              !LOOP AND PASS 3 BY 3 OVER
                                                         WORK
             DO 40 X10=1,10
      C
      C
             DO 20 Y3=1,3
             DO 20 X3=1,3                                !LOOP ON 3 BY 3 BLOCK
             BA3(X3,Y3)=BWA(X10+X3−1,Y10+Y3−1)           !LOAD UP A 3 BY 3 BLOCK
      20     CONTINUE
             CALL CSMSMT (BA3,PA3,TBA,TPA,TLTCNT,DTLUNT) !END LOOP LOAD

!GET SMOOTHED VERSION
             IF (DTLUNT.NE.0) THEN                       !IF WANT DETAILS
             WRITE (DTLUNT,*)'OF BLOCK',X10,Y10
             WRITE (DTLUNT,21) BA3,PA3
      21     FORMAT ('0',3(3I3/))
             END IF                                      !FI
             DO 30 Y=1,3                                 !LOOP ON PIXELS
             DO 30 X=1,3
             PA30((((X10−1)*3)+X),(((Y10−1)*3)+Y))=      !ZAP IN PIXEL ARRAY
      .      PA3(X,Y)
      30     CONTINUE                                    !END LOOP ON PIXELS
      40     CONTINUE                                    !END LOOP ON CHARACTER
      C
      C
      D      WRITE (DBGUNT,*)'PA30 ON EXIT FROM CSMWRK'
      D      WRITE (DBGUNT,41) PA30
      D41    FORMAT (' ',30I1)
             RETURN
             END
```

We claim:

1. A method of enhancing the reproduction of images represented by a plurality of pixels comprising the steps of
holding in a first storage consecutive lines of an image to be reproduced, the pixels of the image being represented by digital signals,
isolating a predetermined portion of the signals of each of the image lines into a second storage means,
forming a pixel pattern from the isolated digital signals including a center pixel signal surrounded by neighboring pixel signals including pixel signals from the same line of the image as the center pixel as well as pixel signals from the lines above and below the center pixel,
generating an identifier uniquely describing the isolated pixel pattern,
comparing the identifier with identifiers representing a plurality of standard pixel formats, and
enhancing the central pixel in accordance with the particular match of the isolated pixel pattern with a standard pixel format.

2. The method of claim 1 wherein the step of forming a pixel pattern includes the step of forming a 3×3 pixel matrix having the center pixel at the center of the matrix and the adjacent pixels being the two pixels to the right and left of the center pixel on the same scan line and the remaining pixels being the three neighboring pixels from the scan lines immediately above and below said same scan line.

3. The method of claim 1 including the step of sequentially comparing the formed pixel pattern to find an equivalent pattern, an equivalent pattern being a pattern having corresponding signals representing signals in each of the neighboring pixel signals.

4. The method of claim 1 including repeating the steps of isolation and comparison for the center pixel by making multiple passes at the line containing the center pixel and the lines immediately above and below the line containing the center pixel, to provide an expanded pixel pattern representing the central pixel.

5. The method of claim 4 including wherein the first pass produces three pixels for the top line of an expanded pixel pattern for the center pixel, the second pass produces the center pixel and two horizontally neighboring pixels for the middle line of the expanded pixel pattern, and the third pass produces three pixels for the bottom line of the expanded pixel pattern.

6. The method of claim 4 including repeating the steps of isolation and comparison for each pixel in a line of pixels representing a line of the image.

7. The method of claim 1 including a step of producing a 3×3 matrix pixel pattern for each pixel of the original image.

8. The method of claim 1 wherein the step of comparing includes the step of comparing the pixel pattern of the isolated signals with the pixel pattern of standard pixel formats to determine equivalence to one of the formats and generating a unique identifying signal in accordance with the particular equivalence determined.

9. The method of claim 1 wherein the step of enhancing the central pixel includes the step of altering the characteristic of the central pixel in response to the characteristic of the neighboring pixels.

10. A method of enhancing a black and white digitally defined image represented by a plurality of pixels including the steps of
representing a pixel of the image in a multipixel pattern, the pattern including said pixel and the pixels in the image surrounding said pixel,
generating an identifier characterizing the multipixel pattern, and
responding to the identifier for each multipixel pattern to produce an expanded pattern for said pixel, said expanded pattern corresponding to the characteristics of the multipixel pattern.

11. The method of claim 10 wherein the step of producing an enhanced pattern includes the step of comparing the identifier with identifiers representing standard pixel formats.

12. The method of claim 11 wherein the step of comparing includes the step of comparing in a predetermined order whereby to expedite the producing of the enhanced patterns.

13. The method of claim 11 wherein the step of comparing includes the step of comparing the identifier with rotational images of the standard pixel formats.

14. The method of claim 11 wherein the step of comprising includes the step of comparing the identifier with mirror images of the standard pixel formats.

15. The method of claim 11 wherein the step of comparing includes the step of producing a first default pattern in response to finding no match in comparing the identifier to a first set of standard pixel formats.

16. The method of claim 15 including the step of producing a second default pattern in response to finding no match in comparing the identifier to a second set of standard pixel formats.

17. The method of claim 16 wherein the second set of standard pixel formats includes the first default pattern.

18. A method of enhancing the reproduction of black and white digitally defined images represented by a plurality of signals representing the image pixels comprising the steps of
isolating a predetermined number of the pixel signals,
forming a pattern from the isolated pixel signals including a center pixel and surrounding pixels,
generating an identifier uniquely describing the isolated pixel pattern,
expanding the central pixel in accordance with the particular identifier.

19. The method of claim 18 wherein the step of enhancing includes the step of expanding each center pixel into a matrix of pixels.

20. The method of claim 19 including the step of forming a pattern for each image pixel, each image pixel being the center pixel for at least one pattern.

21. A method of enhancing reproduction of graphic characters comprising the steps of:
dividing the source image into a plurality of sectors,
generating an identifier data word uniquely describing the status of the sectors immediately surrounding each sector in the source image, and
applying said identifier to a storage element to select from said element a converted word specifying a plurality of enhanced sector elements for each original sector element.

22. Apparatus for enhancement of an image represented by a plurality of pixels including
a register for receiving digital representations of the pixels of the image, the representations including at least portions of successive scan lines of the image,
means for storing a portion of each of the pixel representations of the successive scan lines to form a composite pixel pattern,
a source of standard pixel formats,
means for comparing the composite pixel patterns with standard formats,
logic means responsive to the comparison for producing signals representative of the comparison, and
a decoder responsive to the signals representing the comparison to produce an enhanced pixel pattern for each pixel of the image.

23. The apparatus of claim 22 wherein the register includes three shift registers, each shift register storing the pixels from one scan line of the image.

24. The apparatus of claim 22 wherein the means for storing includes a 3 bit shift register for storing the electrical representations of 3 pixels from each of the scan lines of the image to form a 3×3 matrix pixel pattern.

25. The apparatus of claim 22 wherein the means responsive to produce an enhanced pixel pattern includes logic means to produce a multipixel pattern for each pixel of the image.

26. The apparatus of claim 22 including means to produce a 3×3 matrix pattern for each pixel of the image.

27. Apparatus for enhancing the reproduction of a digitally defined black and white image, comprising:
means for receiving a digital signal representing the line-by-line scanned image,
means for storing said digital signals during a plurality of successive scan lines,
means for generating from said stored digital signals an identifier word representing the status of neighboring sectors surrounding each given sector of said image, and
storage means containing data representative of a transformed image pattern corresponding to each element of the input pattern, and
means for applying said identifier to said storage means to select a transformed sector matrix for each sector in the original image.

* * * * *

REEXAMINATION CERTIFICATE (1958th)
United States Patent [19]
Walsh et al.

[11] B1 4,437,122
[45] Certificate Issued  Mar. 30, 1993

[54] LOW RESOLUTION RASTER IMAGES

[75] Inventors: Brian F. Walsh, Etna; David E. Halpert, Enfield, both of N.H.

[73] Assignee: Xerox Corporation, Stamford, Conn.

Reexamination Request:
No. 90/002,532, Dec. 5, 1991

Reexamination Certificate for:
Patent No.: 4,437,122
Issued: Mar. 13, 1984
Appl. No.: 303,742
Filed: Sep. 21, 1981

[30] Foreign Application Priority Data

Oct. 5, 1985 [JP]  Japan ................ 60-222059

[51] Int. Cl.$^5$ .......... H04N 1/38; H04N 5/14
[52] U.S. Cl. .................. 358/166; 358/447; 358/456; 358/458; 340/728; 382/54
[58] Field of Search .......... 358/166, 426, 456, 458, 358/459; 340/723, 728, 730

[56] References Cited

U.S. PATENT DOCUMENTS

| | | | |
|---|---|---|---|
| 3,573,789 | 4/1971 | Sharp et al. | 340/324 |
| 3,737,855 | 6/1973 | Cutaia | 340/146 |
| 3,846,754 | 11/1974 | Oka et al. | 340/146 |
| 4,124,870 | 11/1978 | Schatz et al. | 358/260 |
| 4,323,974 | 4/1982 | Sekigawa | 364/515 |
| 4,355,337 | 10/1982 | Sekigawa | 358/284 |
| 4,360,883 | 11/1982 | Ejiri et al. | 364/515 |
| 4,450,483 | 5/1984 | Coviello | 358/166 |

FOREIGN PATENT DOCUMENTS 53-133335  11/1978  Japan.
55-66051   5/1980  Japan.

OTHER PUBLICATIONS

Billings, IBM Technical Disclosure Bulletin, vol. 21, No. 8, Jan. 1979, pp. 3086–3087.
Gagnon et al., IBM Technical Disclosure Bulletin, vol. 21, No. 9, Feb. 1979, pp. 3073–3674.

*Primary Examiner*—Edward L. Coles, Sr.

[57] ABSTRACT

The present invention enhances the resolution and quality of characters of a system receiving the information initially in the form of video display pixels and providing hard copy output. This is accomplished by storing at least three successive lines of video data in successive, parallel connected shift registers, applying the outputs of the shift registers to a decoder, and generating driving signals for the printer head. The decoder compares the pixels on the same line as well as in preceeding and succeeding lines that surround each specific input pixel to generate the printer head driving signals according to whether straight or curved line segments are to be formed. In effect, the printer increases the density of the information elements and simultaneously provides rounding off of character edges and smoothing of diagonals.

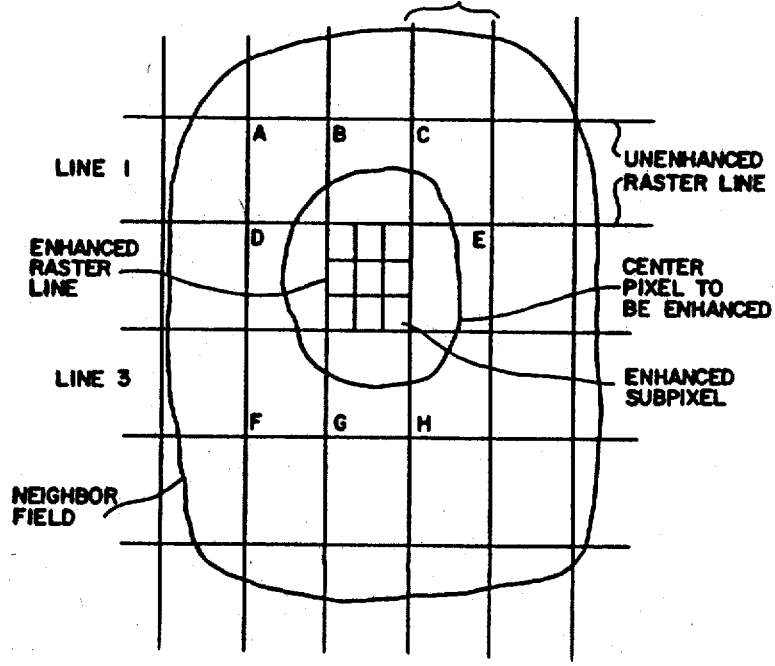

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10-27 is confirmed.

Claim 1 is determined to be patentable as amended.

Claims 2-9 dependent on an amended claim, are determined to be patentable.

New claims 28-57 are added and determined to be patentable.

1. A method of enhancing the reproduction of images represented by a plurality of pixels comprising the steps of:
holding in a first storage consecutive lines of an image to be reproduced, the pixels of the image being represented by digital signals,
isolating a predetermined portion of the signals of each of the image lines into a second storage means,
forming a pixel pattern from the isolated digital signals including a center pixel signal surrounded by neighboring pixel signals including pixel signals from the same line of the image as the center pixel as well as pixel signals from the lines above and below the center pixel,
generating an identifier uniquely describing the isolated pixel pattern,
comparing the identifier with identifiers representing a plurality of standard pixel formats, and
enhancing the central pixel in accordance with the particular match of the isolated pixel pattern with a standard pixel *pattern* format *by expanding the center pixel into a matrix of pixels.*

28. *The method of claim 1 wherein the step of enhancing the central pixel by expanding the center pixel into a matrix of pixels includes the step of adding or deleting pixels to improve the curvilinear shape of the image.*

29. *The method of claim 1 wherein a predetermined standard pixel format is a default format and including the step of selecting the predetermined standard pixel format upon determination that no match exists with the remaining standard pixel formats.*

30. *The method of claim 29 wherein the default format provides a matrix of identical pixels.*

31. *The method of claim 1 wherein the center pixel signal represents a black pixel and the step of generating an identifier includes the step of examining the neighboring pixel signals.*

32. *The method of claim 31 wherein the matrix of subpixels includes at least one white sub pixel.*

33. *The method of claim 1 wherein the identifier is a function of the neighboring pixel signals independent of the on-off status of the center pixel signal.*

34. *The method of claim 1 wherein some of the plurality of standard pixel formats are mirror images of other standard pixel formats pixel signal.*

35. *The method of claim 1 wherein some of the plurality of standard pixel formats are rotational images of other standard pixel formats.*

36. *The method of claim 1 wherein the step of enhancing the central pixel includes a plurality of scans of the line comprising the center pixel.*

37. *The method of claim 36 wherein the plurality of scans of the line comprising the center pixel includes the steps of scanning the line comprising the center pixel to provide a first portion, a second portion, and a third portion of said matrix of pixels.*

38. *The method of claim 37 wherein the steps of scanning the line comprising the center pixel to provide a first portion, a second portion, and a third portion of said matrix of pixels includes the steps of scanning the line comprising the center pixel a first time to provide a top row of said matrix of pixels, scanning the line comprising the center pixel a second time to provide a middle row of said matrix of pixels, and scanning the line comprising the center pixel a third time to provide a bottom row of said matrix of pixels.*

39. *The method of claim 1 wherein the step of enhancing the central pixel includes the step of successively scanning the line comprising the center pixel.*

40. *The method of claim 1 wherein the step of enhancing the central pixel in accordance with the particular match of the isolated pixel pattern includes the step of altering the font of the image to be reproduced.*

41. *The method of claim 1 wherein the step of enhancing the central pixel in accordance with the particular match of the isolated pixel pattern includes the step of increasing the point density of the central pixel.*

42. *The method of claim 1 wherein the central pixel comprises a sector and the step of enhancing the central pixel by expanding the center pixel into a matrix of subpixels includes the step of providing an on-off status for each subpixel within the sector of the central pixel.*

43. *The method of claim 1 wherien said matrix of sub pixels includes black and white representative pixels when said central pixel is black.*

44. *The method of claim 10 wherein the step of generating an identifier includes the steps of comparing the multipixel pattern to selected preprogrammed patterns to determine a match of the multipixel pattern with a selected preprogrammed pattern.*

45. *The method of claim 10 wherein the step of producing an expanded pattern includes the step of increasing the density of the digitally defined image and simultaneously rounding off image edges.*

46. *The method of claim 10 wherein the step of responding to the identifier for each multipixel pattern to produce an expanded pattern for said pixel includes the step of comparing the identifier with a set of reference pixel formats to produce a match.*

47. *The method of claim 46 wherein the set of reference pixel formats includes reference pixel formats that are mirror images of other reference pixel formats.*

48. *The method of claim 46 wherein the set of reference pixel formats includes reference pixel formats that are rotational images of other reference pixel formats.*

49. *The method of claim 10 wherein said pixel in the multipixel pattern is black and the step of generating an identifier includes the step of examining said multipixel pattern.*

50. The method of claim 49 wherein the expanded pattern includes at least one white pixel.

51. The method of claim 10 wherein the identifier is a function of the multipixel pattern exclusive of the on-off status of said pixel.

52. The method of claim 10 wherein the step of producing an expanded pattern for said pixel includes a plurality of scans of said pixel.

53. The method of claim 52 wherein the plurality of scans of said pixel, includes the steps of scanning said pixel to provide a first portion, a second portion, and a third portion of said expanded pattern.

54. The method of claim 19 wherein said matrix of pixels represent white and black portions of said enhanced images and said center pixel represents a black portion of said image before enhancement.

55. The method of claim 21 wherein said enhanced sector elements depict both white and black portions of the enhanced image while said original sector element represents a black portion of the source image.

56. The apparatus of claim 25 wherein said enhanced pixel pattern includes pixels representing both black and white portions of said image when said pixel of the image represents a black portion of said image.

57. The apparatus of claim 25 wherein said logic means produces a multipixel pattern depicting both black and white portions of the image for each pixel of the image which represents black portions of said image.

* * * * *